Figure 1:
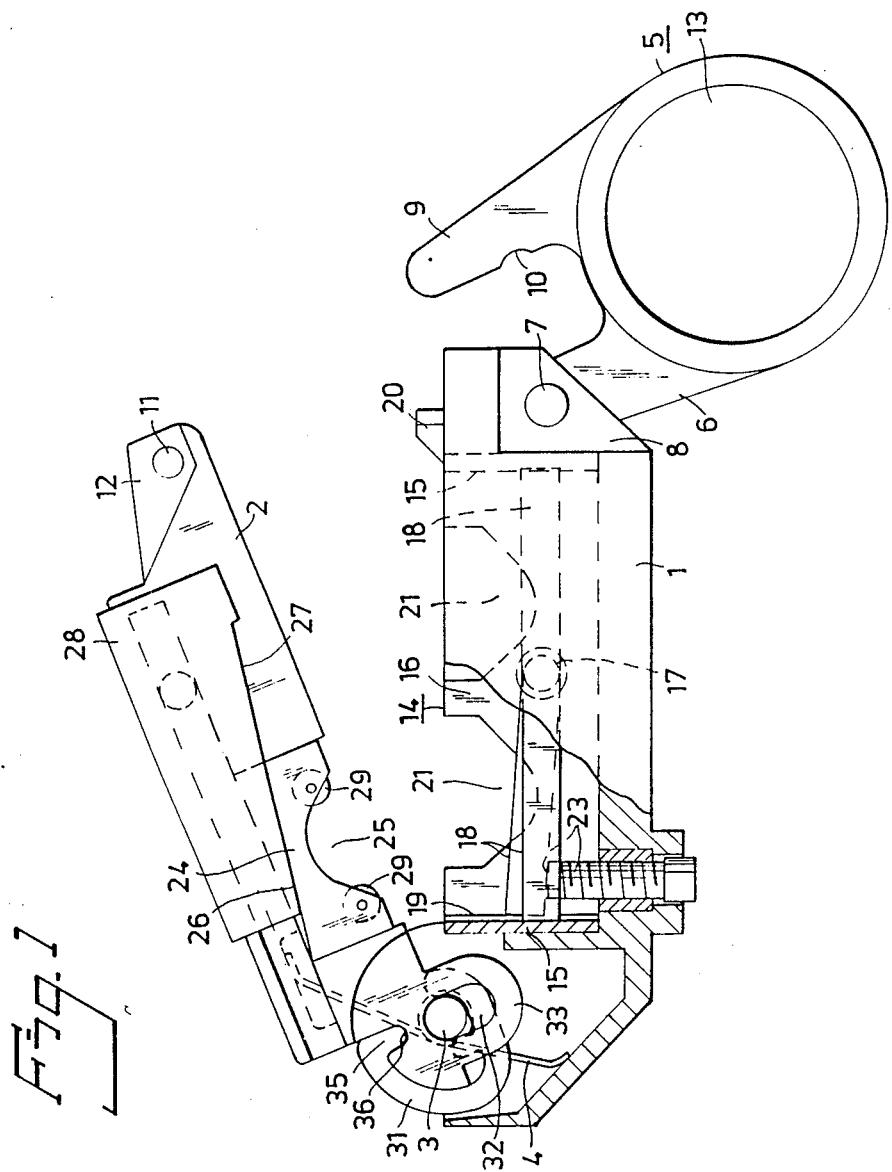

United States Patent [19]

Persson

[11] Patent Number: 4,958,433
[45] Date of Patent: Sep. 25, 1990

[54] CABLE STRIPPING TOOL

[75] Inventor: Lars-Olov Persson, Alvdalen, Sweden

[73] Assignee: Pressmaster Tool AB, Alvdalen, Sweden

[21] Appl. No.: 437,390

[22] Filed: Nov. 16, 1989

[30] Foreign Application Priority Data

Nov. 16, 1988 [SE] Sweden .................................. 8804138

[51] Int. Cl.[5] ............................................. B26B 17/00
[52] U.S. Cl. ...................................... 30/91.2; 30/90.1
[58] Field of Search ..................... 30/90.1, 91.2, 90.9,
30/91.1; 81/9.44

[56] References Cited

U.S. PATENT DOCUMENTS 2,752,676 7/1956 Trickle .................................. 30/91.2
4,130,031 12/1978 Wirner ............................. 30/91.2 X
4,429,460 2/1984 Hill et al. ............................. 30/90.1

Primary Examiner—Douglas D. Watts
Attorney, Agent, or Firm—Fleit, Jacobson, Cohn, Price, Holman & Stern

[57] ABSTRACT

A tool for stripping insulation from electric cables has two jaws. The jaws are mounted at one end on a pin and can be swung towards each other and latched in their swung-together position. The jaws are provided with a cable support means and a countersupport means or bed, for receiving a cable to be stripped. In their swung-together position, the jaws can be moved apart at one end thereof to a limited extent against the bias of a spring means which endeavors to hold the jaws together.

3 Claims, 2 Drawing Sheets

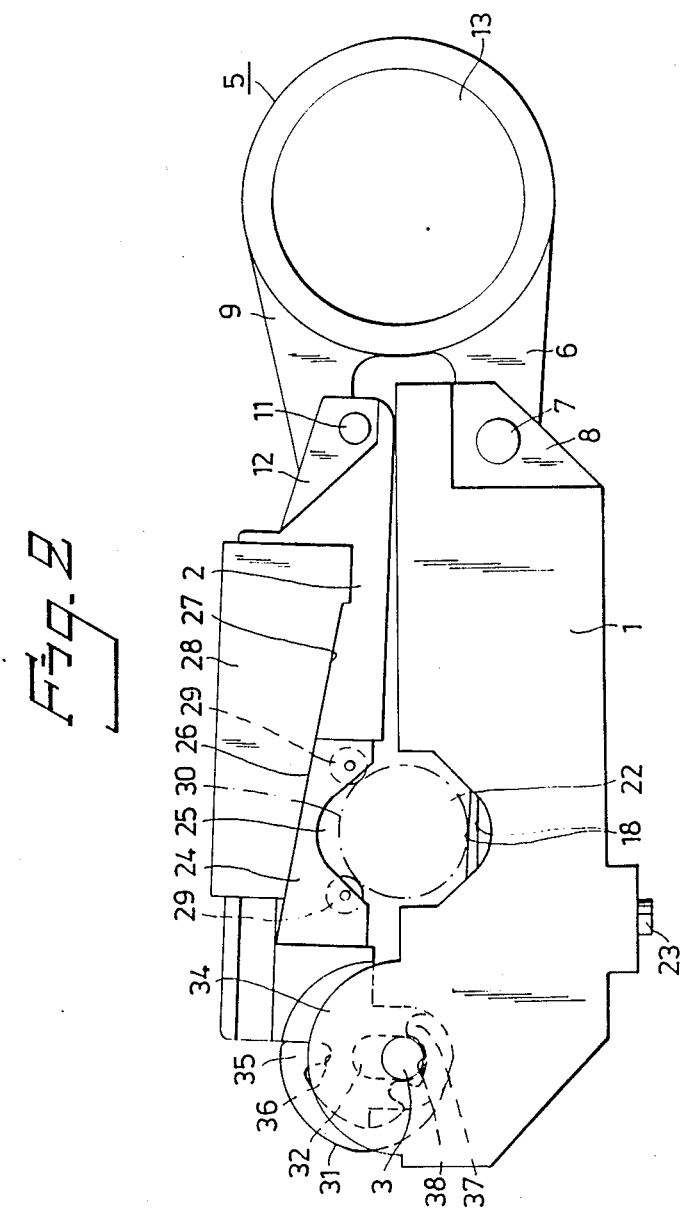

CABLE STRIPPING TOOL

The present invention relates to a cable or wire stripping tool of the kind including two elongated jaws which can be latched in a mutually swung-together position, and in which tool one jaw carries in spaced relationship with its opposite ends at least one cutting blade which extends substantially in the direction of the longitudinal axis of the jaw, and a cable support means for accommodating a cable to be stripped substantially perpendicularly to said blade, and in which the other jaw carries a counter-support means intended for supporting co-action with a cable located on the cable support means, said counter-support means being moveable in a controlled fashion relative to the associated jaw towards and away from the opposing jaw in the swung-together position of said jaws. A tool of this kind is previously described and illustrated in the U.S. Pat. No. 4,130,031.

An object of the present invention is to provide a new and advantageous spring arrangement which will considerably increase the useful range of an insulation stripping tool of said kind.

With the aforesaid object in mind, it is proposed that when the jaws of such a tool are in a closing or swung-together position, one end of the jaws can be moved apart to a limited extent against the action of a spring bias. This will enable the counter-support means to be adjusted quite independently of the tendency of the jaws to move apart against the action of said spring bias.

Preferred embodiments of the invention are set forth in claims 2 and 3.

The invention will now be described in more detail with reference to an exemplifying embodiment thereof illustrated in the accompanying drawing, in which FIG. 1 is a side view, partly in section, of a preferred insulation stripping tool constructed in accordance with the invention, and shows the jaws of the tool in their open position; and FIG. 2 is a side view of the same tool in a closed position, with the jaws held apart at one end against the bias exerted by a spring means.

The tool illustrated in the Figures has two elongated jaws 1 and 2 which are hingedly connected together at one end thereof. The jaws 1,2 are pivotable about a pivot pin 3 extending transversely to the longitudinal axis of said jaws, for movement between an open position illustrated in FIG. 1 and a closed position illustrated in FIG. 2. The jaws 1,2 are biased towards their open position by means of a spring 4, and are releasably retained in their closed position by a jaw latching means. The jaw latching means comprises a part 5 of substantially U-shape, having a first leg 6 which is pivotably mounted on a pin 7 extending between two lug portions provided on one jaw 1, only one, 8, of these lugs being shown in the drawing. The part 5 has a second leg 9 which has formed therein an indent 10 which is intended to receive a pin 11 in the closed position of the tool. The pin 11 extends between two lug portions formed on the jaw 2, only one, 12, of which lug portions is shown. The web of the U-shaped part 5 joining the legs 6 and 9 is provided with a hole 13 in which one finger of the user, e.g. the right-hand index finger, can be inserted. The part 5 is spring biased to the position illustrated in FIG. 1, in a manner not shown. When closing the tool, the jaw 2 is accordingly pivoted clockwise from the position illustrated in FIG. 1 to the position illustrated in FIG. 2, against the bias of the spring means 4, and the part 5 is pivoted anti-clockwise from the position shown in FIG. 1 to the position shown in FIG. 2, against the action of the mentioned spring bias acting on the part 5, wherein the pin 11 will then snap into the indent 10 and hold the jaw 2 and the part 5 in the closed position, shown in FIG. 2. The tool can be reopened by pivoting the part clockwise in FIG. 2, wherein the pin 11 will leave the indent 10 and the part 5 is returned automatically by said spring bias, to the position shown in FIG. 1.

The jaw 1 includes holder means for accommodating a cutting-blade cartridge 14, illustrated in FIG. 1, this cartridge including end walls 15 connected by side walls 16, of which only the farthermost wall is visible. Extending between the side walls is a pin 17 for pivotal mounting of the blades 18, which are guided at the ends thereof distal from the pin 17 in vertical guide grooves 19 provided in the end walls 15 of the cartridge. The cartridge 14 is held in the holder by means of a latch 20, which co-acts with the upper edge of a cartridge end wall 15 and which is pivotable clockwise, about the pin 7, from the position illustrated in FIG. 1, against the action of a spring bias, such as to release the cartridge. The cassette 14 is symmetrical about a vertical plane passing through the pin 17 and can be placed in two positions in its holder in the jaw 1, namely the illustrated position and a position commensurate with rotation of said illustrated position through 180° about a central vertical axis. The side walls 16 of the cartridge 14 are provided with two pairs of mutually opposing recesses 21, and depending on which of the aforesaid positions the cartridge occupies in its holder one or the other pair of said recesses 21 will be located directly opposite two corresponding cable support means 22 having the form of recesses formed in the sides of the jaw 1. Arranged in the jaw 1 is a number of set screws 23 against which those portions of the blades 18 mounted on the pin 17 and located in the region of the cable support means 22 will rest. The extent to which the blades 18 project into the recesses 21 and cable support means 22 can be adjusted with the aid of the set screws 23.

The jaw 2 has provided therein a counter-support means or bed 24, which has the form of a block incorporating a recess 25 and which is intended for co-action with the cable support means 22. The counter-support means, or block 24, is guided in the jaw 2 for reciprocating movement in relation to the opposing jaw 1 and is provided with inclined surfaces 26 intended for co-action with corresponding inclined surfaces 27 on a slide 28 mounted for reciprocal movement along the jaw 2. Spring means (not shown) are operative to hold the inclined surfaces 26 on the counter-support means 24 in contact with the inclined surfaces 27 on the slide 28, and the counter-support means will thus move downwards, as seen in FIGS. 1 and 2, when the slide 28 is moved to the left from the position shown in the Figures. The counter-support means 24 is provided with rollers 29 which are operative to reduce friction against a cable 30 located between said means and the cable support means, said cable being shown by a chain line and comprising, for instance, a co-axial cable which is to be stripped of its insulation by means of the illustrated tool.

When the tool is to be used, the end portion of a cable 30 is placed on the cable support means 22 with the tool in its open position, as illustrated in FIG. 1, and the jaws of the tool are then closed around the cable 30, as illustrated in FIG. 2. The tool is then twirled around the cable 30, with the aid of a finger inserted into the hole 13, until the blades 18 have completely penetrated to the intended depth of insulation layers or the like. This severing of the insulation can take places successively, beginning with the slide 28 in the initial position illustrated in the Figures, and terminating with the slide in a pre-determined position, displaced to the left in FIGS. 1 and 2. The severed or cut insulation layers or the like are then stripped off, by pulling the closed tool away from the cable end, optionally after the slide has once again been moved to the position illustrated.

The tool described up to this point is known in all essentials from U.S. Pat. No. 4,130,031, which publication is considered to form part of this application, by virtue to the reference made thereto.

According to the present invention, when the jaws 1, 2 are closed, the jaws can be swung apart at one end thereof to a limited extent, against the action of a spring bias. This pivotal movement of the jaws 1, 2, namely about the pivot pin 11, is illustrated in FIG. 2, and the spring bias is achieved with the aid of a spring means which comprises two substantially C-shaped springs 31, only one of which can be seen in FIGS. 1 and 2. More specifically, the pin 3 is received in guide slots 32 provided in depending lugs 33 on the jaw 2, these lugs extending parallel to the direction of movement of the counter-support means 24, and in circular holes formed in upstanding lugs 34 provided on the outside of the lugs 33. Only one of each of the lugs 33 and 34 is shown in the Figures. The same also applies to the slots 32, which have a width corresponding to the diameter of the pivot pin 3 and a length which is equal to the total distance to which the jaws 1, 2 can be moved apart.

The springs 31 are intended to be snapped onto the jaw 2 and the pin 3 extending through the slots 32 to a position in which a first, inwardly bent leg-end 35 of respective springs 31 engages the jaw 2, suitably in an indent 36 complemental to the leg end 35, in the manner illustrated, and in which a second, inwardly bent leg-end 37 of respective springs 31 engages against the pin 3. As will best be seen from FIG. 2, the leg end 37 can be formed, advantageously, with a substantially semi-cylindrical support cup 38, for receiving and retaining the pin 3. That portion of the C-shaped springs 31 which is located between the leg ends 35, 37 can be straightened resiliently from the position illustrated in FIG. 1, in which the pin 3 is biased against one end of the guide slots 32 by the springs 31, to the position illustrated in FIG. 2, in which the pin is urged against the opposite end of the slots 32, by the force exerted on the jaws 1, 2 by the cable 30 located between the cable support means 22 and the counter-support means 24 and the springs 31. As the tool is twirled or rotated around the cable 30, the blades 18 will cut into the underlying insulation, so that the cable, biased by the springs 31, is urged down into the cable support means 22 and obtains space between the cable support means and the counter-support means 24. The springs 31 therewith return to their original starting position, shown in FIG. 1.

As will be understood, the inventive tool can be used for stripping insulation from cables within a relatively large diameter range. Despite this, the tool is small and compact and the arrangement of springs 31 will only add negligibly to the overall size of the tool.

It will be understood that the invention is not restricted to the aforedescribed and illustrated embodiment, but can be realized in any manner within the scope of the inventive concept defined in the claims. Thus, the device for allowing the jaws to move apart to a limited extent against the action of a spring means could be located at that end of the jaws where these jaws are arranged to be latched together.

I claim:

1. A tool for stripping insulation from electric cables, including two elongated jaws which are hinged together at one end thereof and which can be latched in a mutually swung-together position, and in which one tool jaw carries in spaced relationship with its opposite ends at least one cutting blade which extends substantially in the direction of the longitudinal axis of the jaw, and a cable support means for accommodating a cable to be stripped substantially perpendicularly to said blade, and in which the other jaw carries a counter-support means intended for supporting co-action with a cable located on the cable support means, said counter-support means being moveable in a controlled fashion relative to the associated jaw towards and away from the opposing jaw in the swung-together position of said jaws, wherein when in their swung-together position, the jaws can be moved apart to a limited extent at said one end thereof, against the action of a spring bias.

2. A tool according to claim 1, wherein the jaws are provided at said one end with a pivot pin which extends transversely to the jaws and joins said jaws together, said pin being accommodated in guide slots provided in one of said jaws, these slots extending substantially parallel to the direction of movement of the counter-support means and having a width substantially corresponding to the diameter of the pivot pin and a length which is equal to or greater than the maximum parting distance of the jaws, and wherein a spring means acting between the pivot pin and the guide-slot carrying jaw is operative to bias said pivot pin against one end of said guide slots.

3. A tool according to claim 2, wherein the spring means includes two substantially C-shaped springs which can be snapped onto the guide-slot carrying jaw and onto the pivot pin to an assemblage position in which one leg end is in engagement with said jaw and the other leg is in engagement with the pivot pin, said springs being operative to bias the pivot pin against one end of the guide slots, and wherein the portion of the springs located between the leg ends can be straightened such as to allow the pivot pin to move along the guide slots in a direction away from said one end of the slots.

* * * * *